United States Patent Office 2,820,935
Patented Jan. 21, 1958

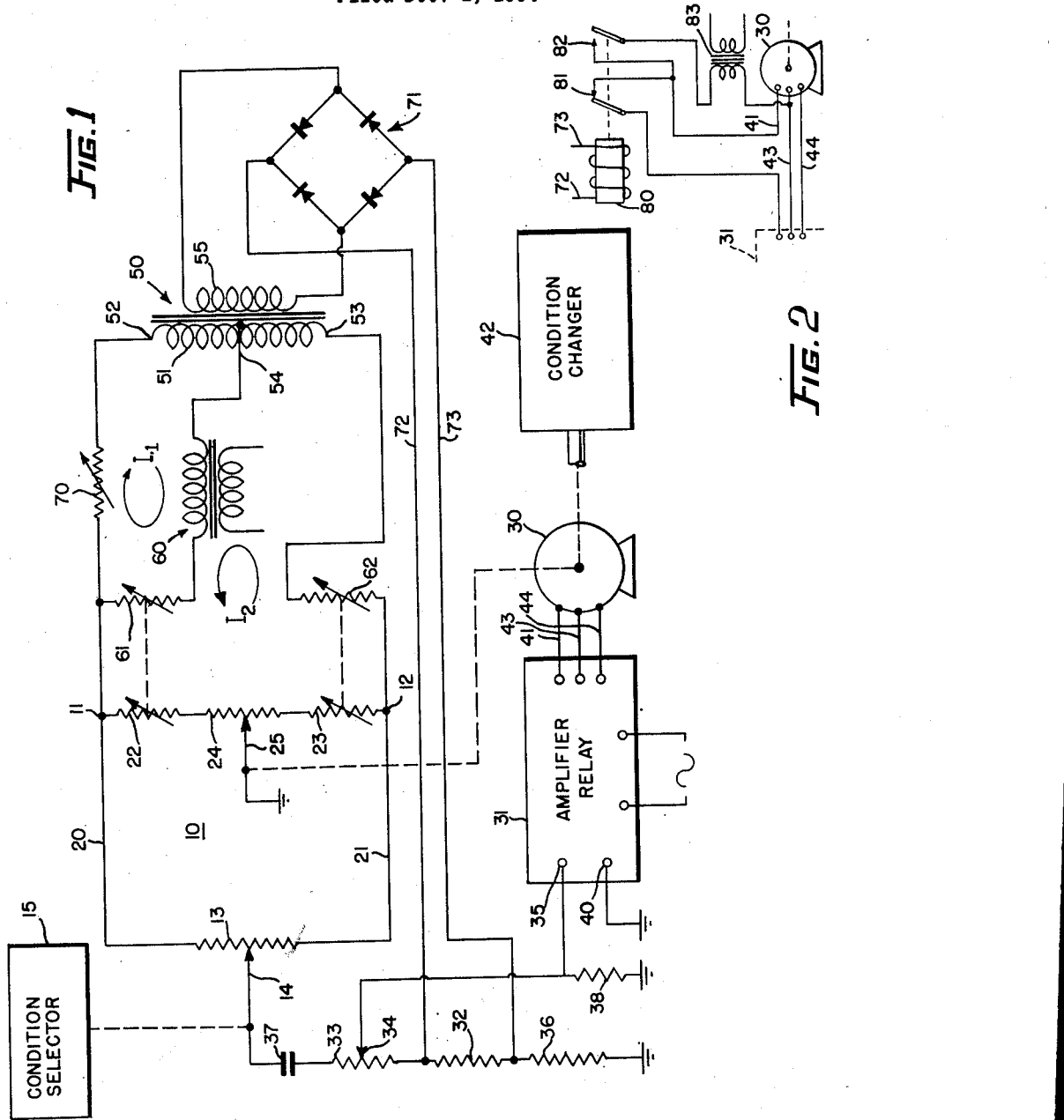
Jan. 21, 1958  D. B. KLEASON  2,820,935
FAIL-SAFE SERVOSYSTEM
Filed Dec. 1, 1954
INVENTOR
DEMETRIUS B. KLEASON
BY Joseph E. Ryan
ATTORNEY

2,820,935

FAIL-SAFE SERVOSYSTEM

Demetrius B. Kleason, St. Paul, Minn., assignor to Minneapolis-Honeywell Regulator Company, Minneapolis, Minn., a corporation of Delaware Application December 1, 1954, Serial No. 472,277

9 Claims. (Cl. 318—29)

This invention is concerned with a failure detection circuit for use with electrical bridge circuits, in particular, bridge circuits having long wires between different components which are subject to opens and shorts rendering the bridge circuit inoperative.

In remote positioning devices in particular those having bridge circuits with a plurality of potentiometers one being adjusted by a selector and a second by a motor connected to the output of the bridge circuit to provide the follow-up action a null condition is established by substantially electrically aligning the selector wiper and the follow-up wiper. Where the selector component of the bridge is remotely positioned from the follow-up component such as in an aircraft remote throttle control apparatus possible open circuits or shorts to ground in the leads connecting the components increase the possibility of failure of the remote positioning system. For aircraft throttle control, in particular, it is desired to provide for some sort of bias to the throttle motor to render it inactive or to close the throttle whenever a defect exists in the bridge circuit. This invention provides a means of detecting any substantial change in the current flow between the power source and the bridge circuit as the bridge circuit normally requires very little power. Thus upon the presence of a short or an open in the leads of the bridge circuit per se the amount of power required by the bridge would be substantially changed, such indicating inoperativeness and thus means is provided for biasing the device controlled in a predetermined manner. It is therefore an object of the present invention to provide an improved apparatus for detecting a short, open or similar electrical failure in a bridge circuit.

A further object of the present invention is to provide an improved network circuit for obtaining a biasing signal to control a condition changer in a predetermined manner whenever an electrical failure occurs in the network circuit.

A still further object of the present invention is to provide an improved bridge network circuit used in a remote positioning system in which a detector circuit responsive to shorts, opens or similar failures in the bridge circuit is effective to bias the controlled device in a selected manner upon the presence of such a failure.

Other objects of the invention will become apparent upon a study of the following specification and drawings of which:

Figure 1 is a schematic drawing of a bridge network circuit with a failure detector circuit for biasing the controlled device by modifying the input to an amplifier when the power requirement to the main bridge substantially varies.

Figure 2 is a second embodiment of the present invention disclosing a relay for controlling a motor when a failure exists in a bridge circuit normally controlling the motor.

Referring to the figure, a bridge network circuit 10 having a pair of terminals 11 and 12 with a plurality of branch circuits connected thereto is shown. A first circuit comprises a resistor 13 having a movable wiper 14 thereon, the wiper being positioned by some sort of condition selector 15. In certain applications, the condition selector and the resistor 13 might be remotely located from the remaining portion of the bridge so that the wires 20 and 21 connecting resistor 13 to the terminals are quite long. A second branch circuit comprises a pair of trimming resistors 22 and 23 and a resistor 24 having a movable wiper 25 thereon. Wiper 25 is positioned by a motor 30 and acts as a follow-up wiper for a conventional bridge of a null type as explained. The trimming resistors establish the relative positions of wipers 14 and 25 to establish the null condition in the bridge, that is, a condition where there is substantially no output voltage between wipers 14 and 25. The output of the bridge is connected to an amplifier 31 by a circuit including isolation condensor 37 and resistors 32, 33 and 36 connecting wiper 14 to ground. Wiper 25 is also grounded so that the voltage output of the bridge circuit is applied across resistors 32 and 33. A portion of the voltage existing from resistor 33 to ground is taken therefrom by a movable wiper 34 connected to the input terminal 35 of the amplifier and by resistor 38 to ground. A second input terminal 40 is grounded. The output of the amplifier relay 31 is connected by a plurality of conductors 41, 43, and 44 to motor 30. Amplifier relay 31 and motor 30 is of a sort similar to that disclosed in the A. P. Upton Patent No. 2,423,534, issued July 8, 1947. The motor is a reversible motor, its direction of rotation depending upon the phase and magnitude of the signal applied to the input of the amplifier. When the input signal is zero the motor remains stationary. Thus as an unbalance occurs in bridge network circuit 10 having a predetermined phase and magnitude motor 30 will rotate in one direction to position a condition changer 42 connected thereto as well as the follow-up wiper 25 of the network circuit until the follow-up wiper reestablishes the null condition in the bridge network circuit. Should wiper 14 be moved in the opposite direction so that the opposite phase is available from the bridge network circuit the motor will rotate in the opposite direction to also reestablish balance in the bridge network circuit by repositioning wiper 25. As mentioned before a particular application of such a bridge network circuit is in a remotely located throttle positioning mechanism, motor 30 being used to drive the throttle and wiper 14 being positioned by a manual selector possibly located in the pilot's compartment of the aircraft. A transformer 50 or some suitable voltage or current comparing device has an input winding 51 having end terminals 52 and 53 and a center tap 54 and a secondary winding 55. A source of power 60 is connected to the terminals 11 and 12 of the bridge network circuit through a circuit traced as follows: terminal 11, a variable resistor 61, source of power 60, center tap 54, end terminal 53, a variable resistor 62, and terminal 12. Variable resistor 22 is mechanically connected to variable resistor 61 in some suitable manner such as a gang of potentiometers so that as the resistance of resistor 22 is varied the resistance of resistor 61 is proportionately varied. A similar arrangement is provided for resistors 23 and 62 so that as the trim of bridge network circuit 10 is changed by adjusting resistors 22 and 23 a current $I_2$ delivered to the bridge circuit by the source of power is maintained at a substantially constant value, this current passing through the lower half of the primary winding of transformer 50 between center tap 54 and end terminal 53. A second loop circuit also including source of power 60 is traced through a circuit as follows: source of power 60, a variable resistor 70, end terminal 52, center tap 54, and back to the source of power. By the adjustment of resistor 70 a current $I_1$ in this loop is made equal to $I_2$ so that the effect of the upper and lower halves of the primary winding of transformer 50 cancel each other and the output voltage obtained from primary winding 55 is substantially zero.

Primary winding 55 is connected to the opposite terminals of a conventional full wave bridge rectifier 71, the output terminals of this rectifier 71 being connected by conductors 72 and 73 to the extremities of resistor 32 so that in effect the output of rectifier 71 is applied across resistor 32. The output from rectifier 71 is so polarized that when available it provides an input signal to amplifier relay 31 to bias the amplifier in a manner so that motor 30 is rendered inactive and the condition changer remains in a fixed position.

As shown wipers 14 and 25 are substantially aligned and as aligned with the resistance of trim resistors 22 and 23 the bridge 10 is balanced so that the output therefrom is zero and motor 30 is deenergized. Resistor 70 has been adjusted so that the currents $I_1$ and $I_2$ are substantially equal and the output of transformer 50 as well as the output of rectifier 71 is substantially zero. Any change in the trim of bridge 10 by the adjustment of resistor 22 or resistor 23 has little effect on the current $I_2$ as a change in the resistance of either resistor is balanced by a proportionate change in the resistance of resistors 61 and 62, respectively. Also a change in the position of wiper 14 by the condition selector or manual throttle selector as the case may be has little effect upon the current $I_2$ but only provides a voltage output from the bridge circuit to cause operation of motor 30 thus repositioning condition changer 42 until a rebalance of the bridge circuit is attained by a repositioning of follow-up wiper 25.

Let us assume that a short to ground or an open in leads 20 and 21 of bridge circuit 10 occurs and the current level supplied to the bridge, that is $I_2$, either increases or decreases. The current $I_1$ and $I_2$ would then be unequal and when in effect compared by transformer 50 the output of secondary 55 would place an additional bias on amplifier 31 through resistor 32, this causing motor 30 to become inactive.

Referring to Figure 2, a relay 80 is shown having a winding thereon connected to conductors 72 and 73 so that when connected to rectifier 71 shown in Figure 1 an output is available to energize the relay. Associated with relay 80 is a normally closed switch 81 and a normally open switch 82. These switches are connected in the controlling circuit of motor 30 so that the conductor 41 is disconnected from the amplifier 31 and a source of A. C. power 83 is connected to the motor between conductors 41 and 43. As the phase and magnitude of the voltage between conductors 41 and 43 determines the direction of operation of the motor, power source 83 can be selected so that the motor, upon the energization of relay 80, is driven in a predetermined direction.

This second embodiment of the present invention, upon a fault existing in the bridge 10, uses the output of the rectifier 71 to energize relay 80, which drives the motor and thus conditions changer 42 in a predetermined position. However while the invention is described in two particular embodiments it is intended that the invention only be limited by the scope of the appended claims.

I claim:

1. In control apparatus; condition responsive means; condition changing means; said condition responsive means being responsive to a condition indicative of the need of operation of said condition changing means; bridge network circuit means; relay means; motor means; connection means connecting said condition responsive means; bridge network circuit means; relay means; motor means; and condition changing means in the order named; said bridge network circuit means comprising a pair of terminals to which a plurality of branch circuits are connected; a first circuit including a first resistor having a movable wiper thereon, said wiper being positioned by said condition responsive means; a second circuit including first and second variable resistors and a second resistor with a movable wiper thereon, said wiper being positioned by said motor means; an output transformer having a secondary winding and a primary winding with two end terminals and a center tap; a source of power; a third variable resistor; connection means connecting said source of power and said third variable resistor in a series circuit between a first of said pair of terminals and said center tap; means connecting said first and said third variable resistors so that upon the adjustment of the resistance value of the first a simultaneous adjustment of said third resistor occurs; a fourth variable resistor connected between a second of said pair of terminals and one of said end terminals; further means connecting said second and said fourth variable resistors so that upon the adjustment of the resistance value of the second a simultaneous adjustment of the fourth resistor occurs; a balancing resistor connected between a first of said pair of terminals and a second of said end terminals so that upon changing the resistance of said balancing resistor the value of the current in the loops connected across said second end terminal and said center tap and said first end terminal and said center tap can be made equal thus the output of said secondary is zero; means connecting said secondary winding to said relay so that upon the existence of an unequality of the currents in said loops as a result of a failure of said bridge network circuit means said relay means is biased in a direction to render said motor inactive.

2. In control apparatus, condition responsive means, condition changing means, said condition responsive means responsive to a condition indicative of a need of operation of said condition changing means, bridge network circuit means, relay means, motor means, connection means connecting said condition responsive means, said bridge network circuit means, said relay means, said motor means and said condition changing means in the order named, said bridge network circuit comprising a plurality of branches connected between a pair of terminals, a first branch including a resistor having a movable wiper positioned thereon by said condition responsive means, a second branch including a resistor having a movable wiper thereon said wiper being positioned by said motor means, connection means connecting said wiper to said relay means so that a balanced relation is maintained and upon movement of the wiper of said first branch a corresponding new position of the wiper of said second branch is needed to establish network balance, a source of power, a transformer having a center tapped primary winding and a secondary winding, means connecting said source of power and a half of said primary winding in a first series loop between said pair of terminals, further means connecting another half of said primary winding in a series loop circuit including one of said pair of terminals, and second relay means connecting said secondary winding to said motor means so that whenever an unequality exists in said loop circuits an output from said secondary winding is effective to overpower said network circuit.

3. In control apparatus, condition selector means, network circuit means, motor means, condition changing means, means connecting said aforementioned means in the order named, said network circuit means comprising a plurality of branch circuits connected to a pair of terminals, a first branch including a resistor with a movable wiper thereon, said wiper being positioned by said condition selector means, a second branch including a resistor with a movable wiper thereon, said second mentioned wiper being positioned by said motor means, a source of power, electrical current comparing means having an output depending on the difference between the currents in a plurality of circuits connected to its input, a first of said plurality of circuits including said source of power and said second branch circuit, a second of said plurality of circuits including said source of power, electrical means connecting said wipers of said network circuit means to said relay so that upon movement of one of said wipers with respect to the other of said wipers an output is obtained to render said motor means operative thereby positioning said second wiper reestablishing a null condition in said network circuit means, and means responsive to an output of said electrical current comparing means to operate said motor in a predetermined manner.

4. In apparatus for connecting a condition selector remotely to a condition changing device, bridge network circuit means having an input adjustment means and a follow-up adjustment means, said input adjustment means being adapted to be positioned by the condition selector, motor means responsive to the output of said bridge network circuit, said motor means adapted to control the condition changing device and simultaneously position said follow-up adjustment means, electrical current comparing means having an output circuit and a plurality of circuits connected to its input, a source of power, means including one of said circuits for connecting said source of power to said bridge network circuit means so that upon an unbalance of said bridge network circuit means from a null condition said motor means is operative to reestablish balance through said follow-up adjustment means, a second of said plurality of circuits having means for equalizing the currents of said first and second circuits to produce no output from said output circuit of said comparing means, and means for connecting said output circuit of the electrical current comparing means to said motor means so that upon a short or open occurring in said bridge network circuit means the current in said first and second circuits will become unequal and the output of said output circuit will bias said motor means in a predetermined manner.

5. In control apparatus, a network circuit of a null type, a source of voltage, voltage comparing means having a plurality of circuits connected to an input of said comparing means, said means having an output having a voltage whose magnitude depends on the combined effects of the voltages applied to said input by said circuits, a first of said circuits connecting said source of voltage to said network circuit, a second of said circuits including means for adjusting its effect on said voltage comparing means to balance out the effect of said first circuit, thus said output of the voltage comparing means is uneffected by an unbalance of said network circuit from its null position however upon a short or open in said network circuit the effect of said first and second circuits upon said voltage comparing means will be unequal to produce an output therefrom.

6. In apparatus for detecting a short, open or similar electrical failure in a network circuit, electrical current comparing means having a plurality of input circuits connected thereto, said comparing means having substantially no output when the current in each of said circuits is of a predetermined magnitude and phase, a first of said input circuits connected in series with a source of power for the network circuit and having a current level of a first value, a second of said input circuits having means for adjusting its current level so that when the network circuit is normal said comparing means has no output, and means responsive to the output of said comparing means upon the occurrence of electrical failure in the network circuit.

7. In apparatus responsive to the presence of a short, open or similar electrical failure in a network circuit, electrical means having a plurality of circuits connected thereto in comparing relation, said electrical means having an output depending on the resultant effects of each of said circuits, a source of power, a first of said circuits connecting said source of power to said network circuit, means for adjusting the effect of said second circuit on said electrical means so that the resultant effect of said first and second circuits cancel each other, and means connected to said electrical means responsive to a deviation between the effect of said first and second circuits.

8. In control apparatus having condition responsive means, network circuit means, and condition changing means connected in the order named; voltage comparing means having a plurality of input circuits and an output circuit, the voltage from said output circuit depending upon the deviation between the voltages supplied to said input circuits; means including a first of said input circuits for connecting a power supply to the network circuit means; means including a second of said circuits for adjusting the voltage thereto so that normally no voltage exists at said output circuit, and means for connecting said output circuit to said condition changing means so that upon a deviation between the voltage of said input circuits the operation of said condition changing means is modified by said voltage of said output circuit.

9. An apparatus responsive to the presence of an electrical failure in a network circuit, electrical means having a first and a second circuits connected thereto in comparing relation, said electrical means having an output depending upon the resultant effects of each of said circuits, a source of power, connection means including said first circuit connecting said source of power to said network circuit; said second circuit balancing the effect of said first circuit when operation of said network circuit is normal, and means responsive to said output of the electrical means.

References Cited in the file of this patent

UNITED STATES PATENTS

| | | |
|---|---|---|
| 2,423,534 | Upton | July 8, 1947 |
| 2,520,485 | Wild | Aug. 29, 1950 |
| 2,628,333 | Maltby | Feb. 10, 1953 |
| 2,684,459 | Brown et al. | July 20, 1954 |